United States Patent
Sengupta et al.

(10) Patent No.: US 7,408,887 B2
(45) Date of Patent: Aug. 5, 2008

(54) METHODS AND APPARATUS FOR OPERATING A WIRELESS ELECTRONIC DEVICE BASED ON USAGE PATTERN

(75) Inventors: Uttam K. Sengupta, Portland, OR (US); William N. Schilit, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 10/976,936

(22) Filed: Oct. 27, 2004

(65) Prior Publication Data

US 2006/0087981 A1    Apr. 27, 2006

(51) Int. Cl.
*H04J 1/16* (2006.01)
*H04B 17/00* (2006.01)

(52) U.S. Cl. .................... 370/252; 455/67.11; 455/574

(58) Field of Classification Search .............. None
See application file for complete search history.

(56) References Cited

U.S. PATENT DOCUMENTS

| | | | |
|---|---|---|---|
| 5,991,635 A | 11/1999 | Dent et al. | |
| 6,377,790 B1 * | 4/2002 | Ishii | 455/343.1 |
| 6,456,036 B1 * | 9/2002 | Thandiwe | 320/106 |
| 6,560,453 B1 | 5/2003 | Henry, Jr. et al. | |
| 6,986,064 B2 * | 1/2006 | Yoshimoto et al. | 713/300 |
| 6,999,799 B1 * | 2/2006 | Almassy | 455/574 |
| 7,199,783 B2 * | 4/2007 | Wenstrand et al. | 345/156 |
| 2004/0155860 A1 * | 8/2004 | Wenstrand et al. | 345/156 |
| 2004/0259542 A1 * | 12/2004 | Viitamaki et al. | 455/426.2 |
| 2005/0070340 A1 * | 3/2005 | Kim | 455/574 |
| 2005/0131736 A1 * | 6/2005 | Nelson et al. | 705/2 |
| 2005/0221869 A1 * | 10/2005 | Liu et al. | 455/574 |
| 2007/0036096 A1 * | 2/2007 | Sinivaara | 370/318 |

OTHER PUBLICATIONS

Pending U.S. Appl. No. 10/976,946, filed Oct. 27, 2004, to Uttam K. Sengupta, et al.
Pending U.S. Appl. NO. 10/976,935, filed Oct. 27, 2004, to Uttam K. Sengupta, et al.
James "Bo" Begole, et al., "Work Rhythms: Analyzing Visualizations of Awareness Histories of Distributed Groups", CSCW '02, Nov. 16-20, 2002, pp. 334-343.
PCT Search Report dated Mar. 10, 2006.

* cited by examiner

*Primary Examiner*—Andrew Lee
(74) *Attorney, Agent, or Firm*—Schwabe, Williamson & Wyatt, P.C.

(57) ABSTRACT

Embodiments of methods and apparatus to operate a wireless electronic device based on usage pattern are generally described herein. Other embodiments may be described and claimed.

28 Claims, 5 Drawing Sheets

METHODS AND APPARATUS FOR OPERATING A WIRELESS ELECTRONIC DEVICE BASED ON USAGE PATTERN

TECHNICAL FIELD

The present disclosure relates generally to wireless communication systems, and more particularly, to methods and apparatus for operating a wireless electronic device based on usage pattern.

BACKGROUND

As technology advances to provide greater mobility, more and more people are carrying and using multiple wireless electronic devices (i.e., an ensemble) for a variety of reasons such as work, education, and/or entertainment. For example, a person may carry and use an ensemble of portable wireless electronic devices including a laptop computer, a handheld computer, a tablet computer, a wireless (e.g., cordless or cellular) telephone, a pager, an audio and/or video player (e.g., an MP3 player or a digital video disc (DVD) player), a game device, a digital camera, a navigation device (e.g., a global positioning system (GPS) device), and/or wireless peripherals (e.g., a keyboard, a mouse, a printer, etc.).

Many of the wireless electronic devices mentioned above may operate in various modes that require different amount of power. In particular, a wireless electronic device may operate in an active mode, which requires a greater amount of power relative to other operating modes (i.e., high power consumption level). In the active mode, the wireless electronic device may execute an application or a program to generate a visual output on a display screen and/or an audio output via a speaker, to receive a user input via a human interface device, to read and/or write to a memory, and/or to transmit and/or receive communication information for an individual to converse in voice calls, to participate in instant messaging (IM) sessions, to retrieve e-mail or voice messages, to browse the Internet, etc. The wireless electronic device may also operate in an idle or standby mode when an individual is not actively operating the wireless electronic device but the wireless electronic device is readily available to operate in the active mode when necessary. For example, a cellular telephone may operate in the idle mode to monitor for incoming communication such as a voice call, a text message, streaming media, etc. Accordingly, the cellular telephone may require less power to operate in the idle mode than in the active mode (i.e., medium power consumption level). To further reduce power consumption, the wireless electronic device may operate in a sleep mode (i.e., low power consumption level) by disabling or shutting down unnecessary components. For example, the wireless electronic device may automatically operate in the sleep mode when the wireless electronic device is unused for a predefined time period. Alternatively, the individual may manually enable the sleep mode.

As noted above, wireless electronic devices may provide a variety of services and/or a combination thereof. In particular, some of the wireless electronic devices may provide synchronous communication services (e.g., two-way communication occurring at the same time). For example, an individual may participate in a real-time or near real-time communication such as a voice call and/or an IM session provided by a cellular telephone and/or a handheld computer. Alternatively or in addition, some wireless electronic devices may provide asynchronous communication services (e.g., two-way communication occurring at different times). For example, the wireless electronic device may receive a time-delayed message such as an e-mail message and/or a voice message. However, the individual may be asleep, on vacation, or participating in other activities such that the wireless electronic device is inaccessible to the individual and/or the individual is unavailable to use the wireless electronic device. Although existing wireless electronic devices may operate in a sleep mode to reduce power consumption, the sleep mode may not be enabled at the proper time or even at all. In one example, a handheld computer configured to provide asynchronous communication services may continue to consume power throughout the night by operating in an idle mode to receive and provide incoming e-mail messages even though the individual may be asleep and unavailable to receive and/or respond to any of the incoming e-mail messages. Thus, existing wireless electronic devices may consume power even when individuals are not using the devices for various reasons.

DETAILED DESCRIPTION

In general, methods and apparatus for operating a wireless electronic device based on usage pattern are described herein. According to one example embodiment, a usage pattern associated with a wireless electronic device may be identified. The usage pattern may correspond to a manner in which an individual may use the wireless electronic device. Based on the usage pattern, an operating mode of the wireless electronic device may be controlled. For example, the wireless electronic device may operate in a sleep mode and disable (e.g., shut off) components that are not in use (e.g., display screens, disk drives, application processor, transceivers, etc.) to conserve power when the individual is asleep and/or unavailable to use to the wireless electronic device. Further, the wireless electronic device may be associated with an ensemble of wireless electronic devices. In particular, the ensemble of wireless electronic devices may share information such as usage information with each other to manage power consumption by the ensemble. For example, a first wireless electronic device may identify a usage pattern corresponding to a manner in which an individual may use the first wireless electronic device and share the usage pattern with a second wireless electronic device to manage power consumed by the second wireless electronic device. As a result, the ensemble of wireless electronic devices may manage power consumption efficiently as described in detail below. However, the methods and apparatus described herein are not limited in this regard.

Figure 1:
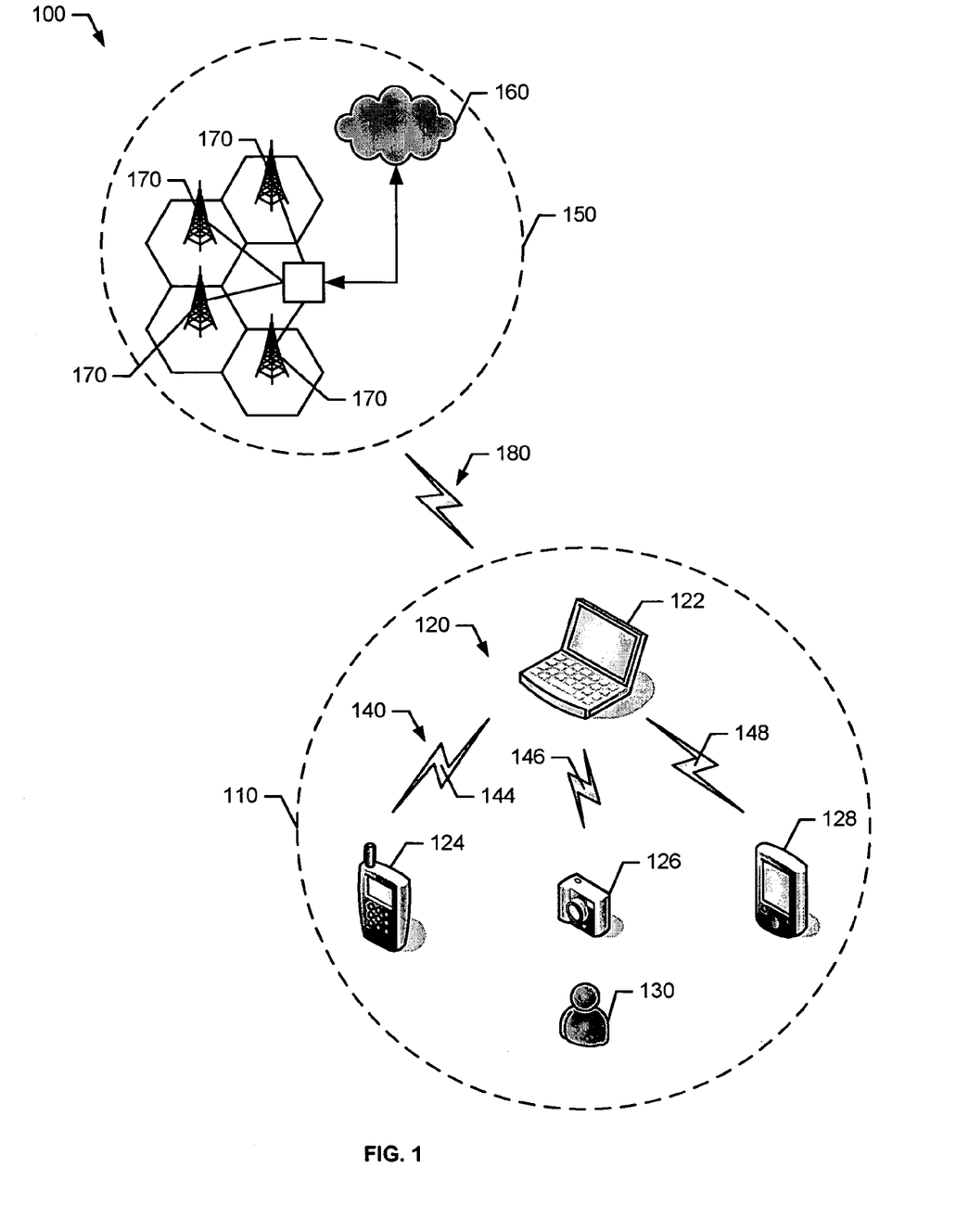
FIG. 1 is a schematic diagram representation of an example wireless communication system according to an embodiment of the methods and apparatus disclosed herein.

Referring to FIG. 1, an example wireless communication system 100 including an ensemble of wireless electronic devices 120 (e.g., generally shown as 122, 124, 126, and 128) is described herein. For example, the ensemble of wireless electronic devices 120 may include a laptop computer, a handheld computer, a tablet computer, a cellular telephone (e.g., a smart phone), a pager, an audio and/or video player (e.g., an MP3 player or a DVD player), a game device, a digital camera, a navigation device (e.g., a GPS device), a wireless peripheral (e.g., a keyboard, a mouse, a printer, etc.), a remote control, and/or other suitable wireless electronic devices. An individual 130 may use and/or carry the ensemble of wireless electronic devices 120 to perform a variety of daily tasks for work, school, and/or leisure. Although FIG. 1 depicts four wireless electronic devices, the ensemble 120 may include additional or fewer wireless electronic devices used and/or carried by the individual 130.

The ensemble of wireless electronic devices 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other via short-range or distance wireless communication links 140, generally shown as 144, 146, and 148. For example, the laptop computer 122 may implement OFDM modulation to transmit large amounts of digital data by splitting a radio frequency signal into multiple small sub-signals, which in turn, are transmitted simultaneously at different frequencies to the cellular telephone 124 via the short-range wireless communication link 144. In particular, the ensemble of wireless electronic devices 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via the short-range wireless communication links with each other. The ensemble of wireless electronic devices 120 may also operate in accordance with other suitable wireless communication protocols that require very low power such as Bluetooth, Ultra Wideband (UWB), Near Field Communication (NFC), and/or radio frequency identification (RFID) to communicate with each other via the short-range of wireless communication links 140. Alternatively, the ensemble of wireless electronic devices 120 may communicate with each other via wired communication links (not shown). For example, the ensemble of wireless electronic devices 120 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate with each other. The methods and apparatus described herein are not limited in this regard.

The wireless communication system 100 may also include a communication network 150, which may include a core network 160 and one or more radio access networks (RANs). Each RAN may include one or more base stations, generally shown as 170, and other radio components necessary to provide communication services to the ensemble of wireless electronic devices 120. The base stations 170 may operate in accordance with the applicable standard(s) for providing wireless communication services to the ensemble of wireless electronic devices 120. That is, each wireless electronic device in the ensemble 120 is configured to operate in accordance with one or more of several wireless communication protocols to communicate with the communication network 150 via a communication link 180. In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

Further, the wireless communication system 100 may include other wireless local area network (WLAN) devices, wireless metropolitan area network (WMAN) devices, and/or wireless wide area network (WWAN) devices (not shown). For example, the wireless communication system 100 may include devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

As noted above, most wireless electronic devices may operate in multiple modes that require different amount of power. In one example, a wireless electronic device (e.g., 122 of FIG. 1) may operate in an active mode, an idle mode, and/or a sleep mode. In particular, the wireless electronic device 122 may provide a variety of services such as communication services to the individual 130 in an active mode. For example, the individual 130 may answer an incoming call and/or place an outgoing call when the wireless electronic device 122 is operating in the active mode. In an idle mode (or standby mode), the wireless electronic device 122 may monitor for a paging message from a base station (e.g., 170 of FIG. 1) to notify the wireless electronic device 122 of an incoming communication such as a voice call, a text message, and/or streaming media. To conserve power, the wireless electronic device 122 may operate in a sleep mode. In particular, the wireless electronic device 122 may disable (i.e., shut off) all unnecessary components for a time period and/or until a trigger event occurs. For example, a laptop computer may disable the display screen, a disk drive, and/or a transceiver. By operating the various modes based on a usage pattern as described in detail below, the wireless electronic device 122 may manage power consumption more efficiently than existing wireless electronic devices.

Figure 2:
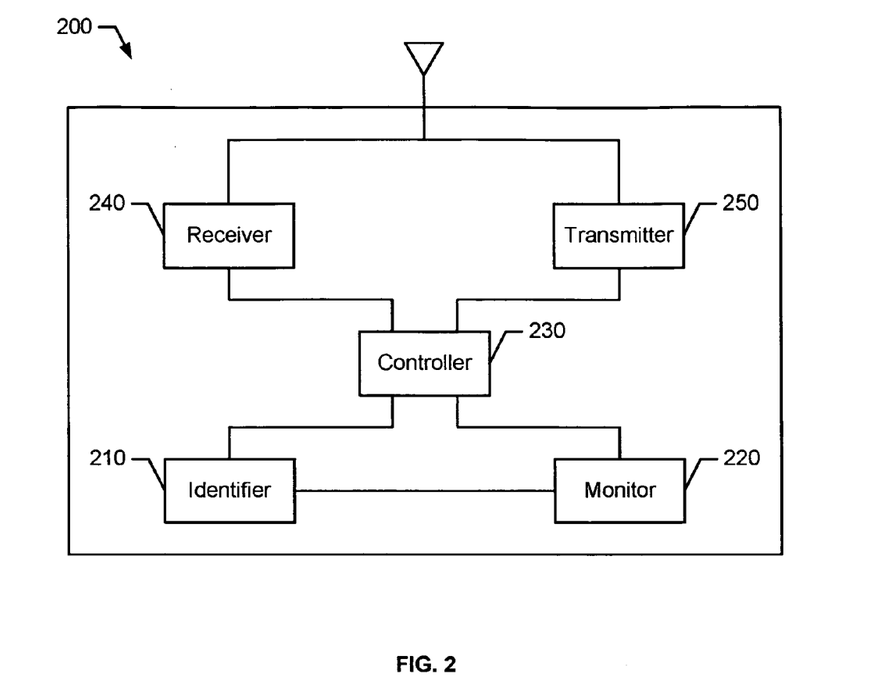
FIG. 2 is a detailed block diagram representation of an example wireless electronic device that may be used with the example wireless communication system of FIG. 1.

In the example of FIG. 2, a wireless electronic device 200 (e.g., generally shown as 122, 124, 126 and 128 in FIG. 1) may include an identifier 210, a monitor 220, a controller 230, a receiver 240, and a transmitter 250. The identifier 210 is configured to identify a usage pattern associated with the wireless electronic device 200. The usage pattern may correspond to a manner in which an individual (e.g., 130 of FIG. 1) may use the wireless electronic device 200. In one example, the identifier 210 may receive usage information from the monitor 220 to identify the usage pattern. To generate the usage information, the monitor 220 may monitor one or more characteristics of the wireless electronic device 200 (e.g., operating mode, time of operation, type of activities, etc.) corresponding to activities of the individual 130 over a time period.

Figure 3:
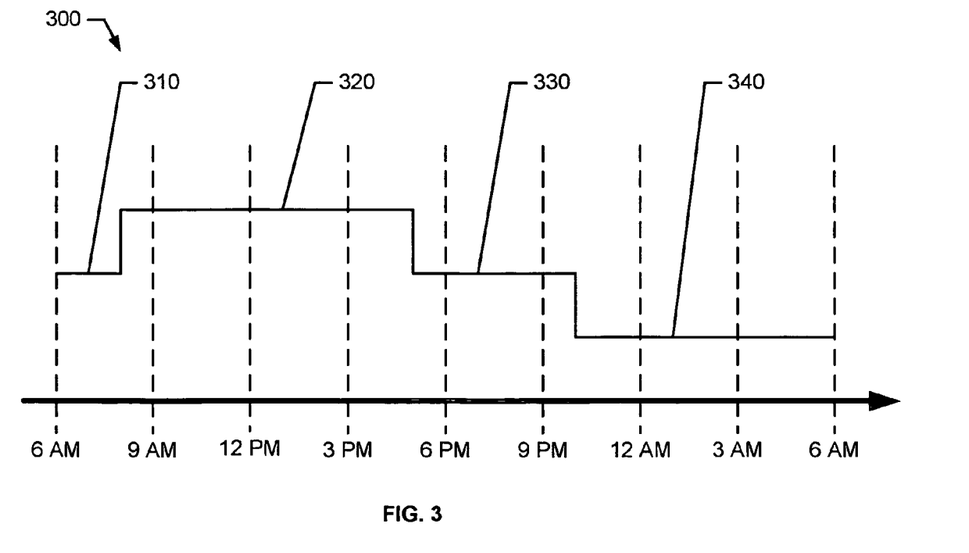
FIG. 3 is a timing diagram representation of a usage pattern associated with the example wireless electronic device of FIG. 2.

Turning to FIG. 3, for example, the monitor 220 may monitor the use of the wireless electronic device 200 by the individual 130 over a circadian period 300 (e.g., a period of approximately twenty-four hours). In general, the individual 130 associated with the wireless electronic device 200 may begin his day by waking up at 6:00 am, getting ready for work, commuting to work, and arriving at work by 8:00 am (310). During this period from 6:00 am to 8:00 am, the wireless electronic device 200 may be turned on but inactive. In contrast, the wireless electronic device 200 may be very busy during normal business hours from, for example, 8:00 am to 5:00 pm (320). For example, the individual 130 may use the wireless electronic device 200 to converse in voice calls, participate in IM sessions, retrieve e-mail or voice messages, browse the Internet, etc. The individual 130 may leave work at 5:00 pm to have dinner, exercise, spend time with his family, and/or participate in other leisure activities (330). Accordingly, the wireless electronic device 200 may again be turned on but inactive. At the end of the night, the wireless electronic device 200 may be turned off or inactive when the individual 130 goes to sleep at 10:00 pm until 6:00 am on the next day (340). Based on usage information indicative of one or more characteristics of the wireless electronic device 200 during the circadian period 300, the identifier 210 may generate a usage pattern corresponding to a manner in which the individual 130 may use the wireless electronic device 200. Thus, the wireless electronic device 200 may conserve power by operating based on the usage pattern. For example, the wireless electronic device 200 may be turned off when the individual 130 is unable or unavailable to use the wireless electronic device 200 (e.g., when the individual 130 is asleep).

Although FIG. 3 depicts one circadian period, the monitor 220 may monitor one or more characteristics of the wireless electronic device 200 during more than one circadian period. In one example, the monitor 220 may monitor one or more characteristics over seven circadian periods (e.g., one week) to generate usage information indicative of a manner in which the individual 130 may use the wireless electronic device 200 during a weekday and/or a weekend. Alternatively, the monitor 220 may monitor one or more characteristics of the wireless electronic device 200 over other suitable time periods in terms of seconds, minutes, hours, days, weeks, months, years, etc. Based on the usage information from the monitor 220, the identifier 210 may adjust the usage pattern to provide a dynamic usage pattern as described in detail below. For example, the identifier 210 may increase or decrease the periods in which the wireless electronic device 200 may operate in the different operating modes. The methods and apparatus described herein are not limited in this regard.

The ensemble of wireless electronic devices 120 may share usage information with each other to manage power consumption as a whole. Referring back to FIG. 2, the identifier 210 may also identify the usage pattern associated with the wireless electronic device 200 based on usage information from one or more other wireless electronic devices. For example, the laptop computer 122 may receive usage information from the wireless telephone 124, the digital camera 126 and/or the handheld computer 128. Accordingly, the laptop computer 122 may identify a usage pattern based on the usage information from the wireless telephone 124, the digital camera 126 and/or the handheld computer 128. The wireless electronic device 200 may also receive usage pattern(s) from one or more other wireless electronic devices to identify a usage pattern associated with the wireless electronic device 200. Based on the usage patterns from the wireless telephone 124, the digital camera 126 and/or the handheld computer 128, for example, the laptop computer 122 may identify a usage pattern associated with the laptop computer 122. Likewise, the wireless electronic device 200 may transmit usage information (e.g., via the transmitter 250) to the other wireless electronic devices of the ensemble 120 to identify corresponding usage patterns. For example, the laptop computer 122 may transmit usage information to the wireless telephone 124, the digital camera 126 and/or the handheld computer 128 so that each of those devices may identify a corresponding usage pattern. Thus, the ensemble of wireless electronic devices 120 may reduce power consumption by operating based on the usage pattern associated with one of the wireless electronic devices 120. The methods and apparatus described herein are not limited in this regard.

Based on the usage pattern identified by the identifier 210 as described above, the controller 230 is configured to control an operating mode of the wireless electronic device 200. Turning to FIG. 3 again, the controller 230 may initiate the idle mode during the time period 310 (e.g., 6:00 am to 8:00 am) as the individual 130 prepares to go to work. In one example, the wireless electronic device 200 may be configured to provide synchronous communication services. Accordingly, the wireless electronic device 200 may be turned on to receive incoming messages but inactive because the individual 130 may be available to review the incoming messages but unable to respond to the incoming messages and/or to prepare outgoing messages. During the time period 320 (e.g., 8:00 am to 5:00 pm), the controller 230 may initiate the active mode so that the individual 130 may conduct business at work. In particular, the individual 130 may be available to review and/or respond to incoming messages and/or to prepare outgoing messages. From when the individual leaves work until bedtime (e.g., 5:00 pm to 10:00 pm), the controller 230 may return to the idle mode to conserve power. Again, the wireless electronic device 200 may be turned on but inactive during the time period 330 because the individual 130 may be available to review incoming messages but unable to respond to incoming messages and/or prepare outgoing messages. To further reduce power consumption, the wireless electronic device 200 may operate in the sleep mode when the individual 130 is asleep (e.g., 10:00 pm to 6:00 am). During the time period 340, the wireless electronic device 200 may be turned off or inactive because the individual 130 is unavailable to receive and/or respond incoming messages and/or to prepare outgoing messages. Thus, the wireless electronic device 200 may operate in various modes based on a manner and/or a schedule in which the individual 130 may use the wireless electronic device 200 (e.g., a usage pattern).

Although the examples above are described with respect to synchronous communication services, the methods and apparatus disclosed herein may be applied to other suitable types of communication and/or computing services. For example, the methods and apparatus disclosed herein may be applied to asynchronous communication services. The methods and apparatus described herein are not limited in this regard.

Figure 4:
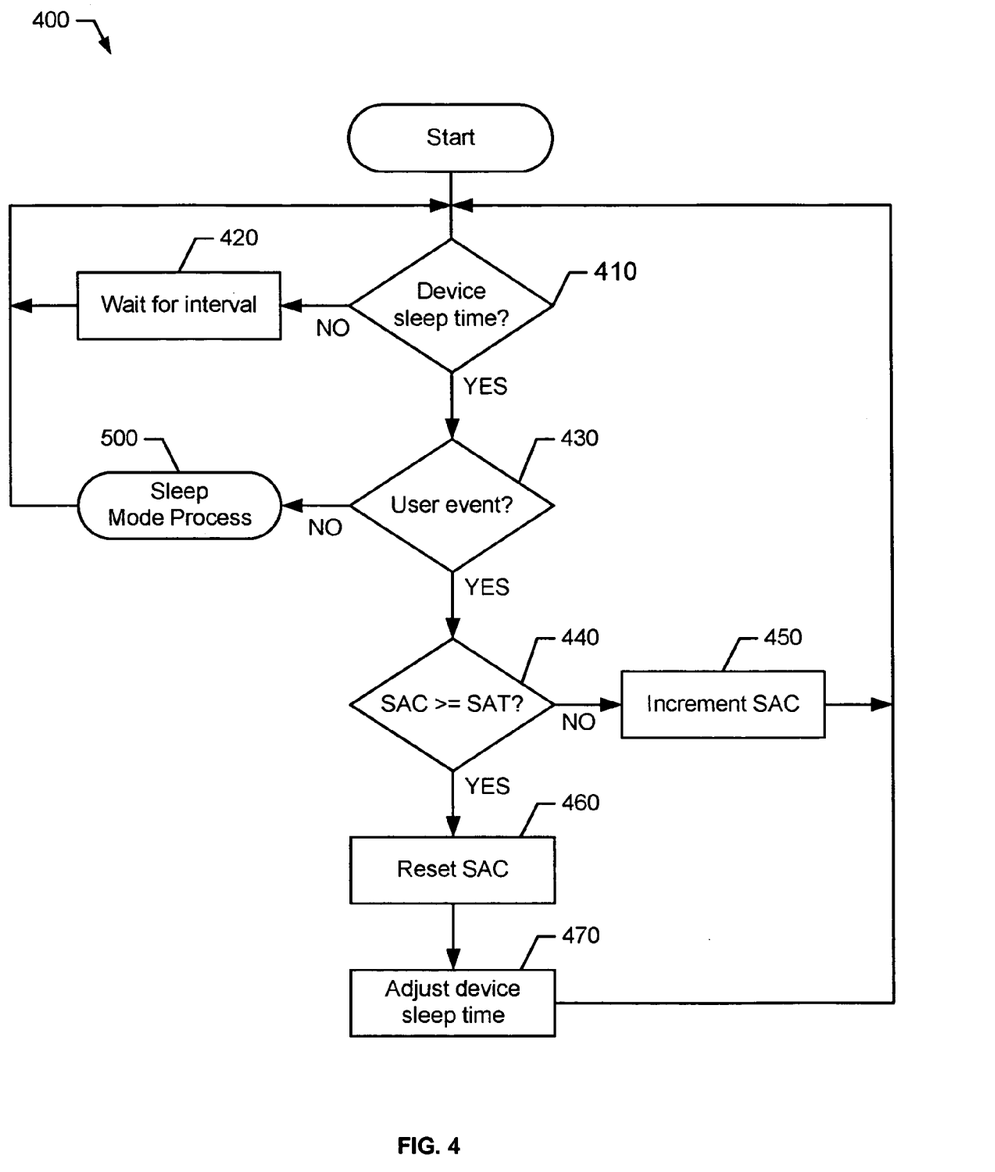
FIG. 4 is a flow diagram representation of one manner in which the example wireless electronic device of FIG. 2 may be configured to operate based on the example usage pattern of FIG. 3.
Figure 5:
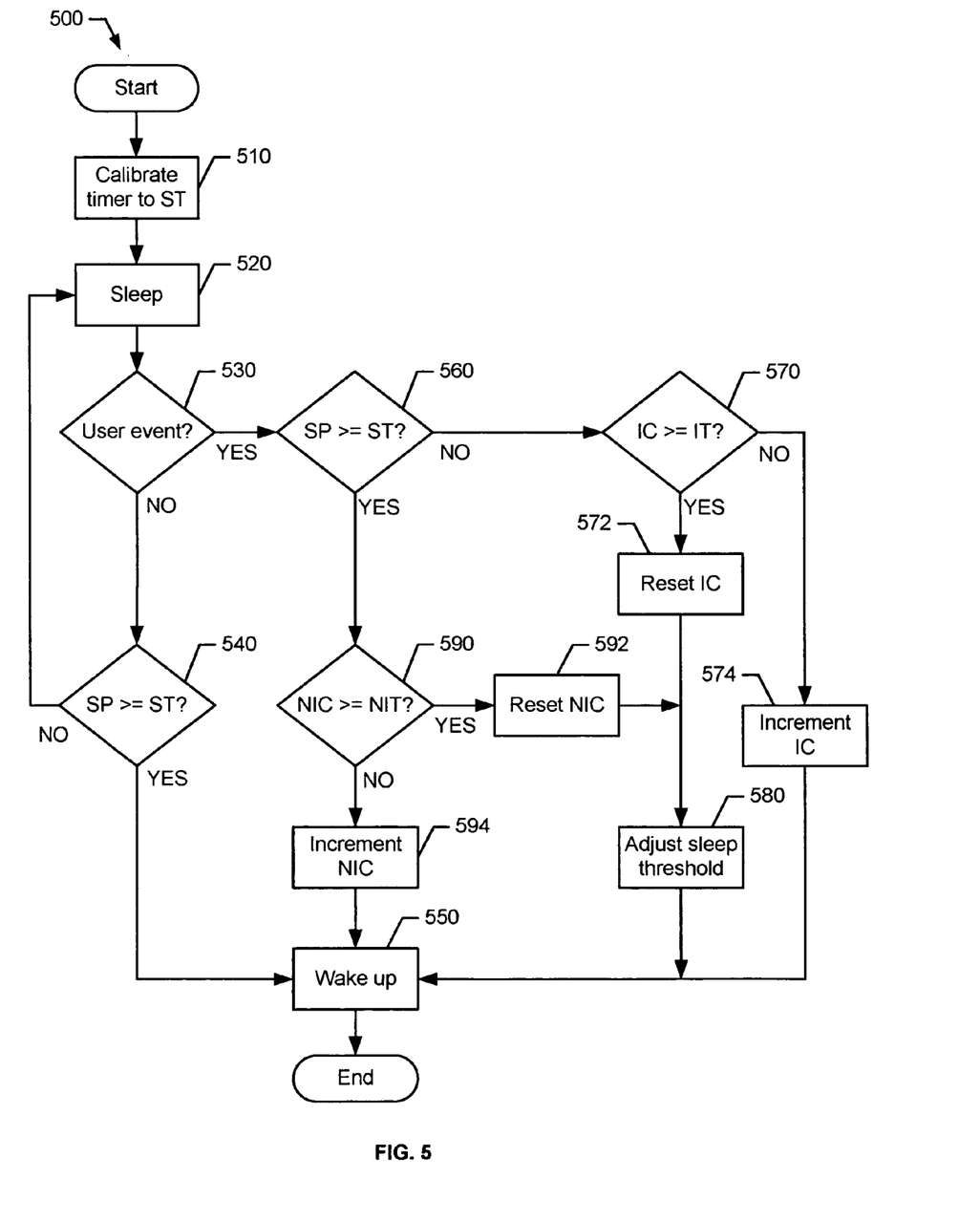
FIG. 5 is a flow diagram representation of one manner in which the example wireless electronic device of FIG. 2 may be configured to implement a sleep mode based on the example usage pattern of FIG. 3.

FIGS. 4 and 5 depict one manner in which the wireless electronic device 200 may be configured to operate based on usage pattern as described herein. The example processes 400 and 500 of FIGS. 4 and 5, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIGS. 4 and 5, these actions can be performed in other temporal sequences. Again, the example processes 400 and 500 are merely provided and described in conjunction with the apparatus of FIGS. 1 and 2 as an example of one way to configure a wireless electronic device to operate based on usage pattern.

In the example of FIG. 4, the process 400 begins with the wireless electronic device 200 determining whether to initiate a sleep mode (block 410). In particular, the identifier 210 may determine whether the current time is a device sleep time associated with the wireless electronic device 200. The device sleep time may correspond to when the individual 130 is not using the wireless electronic device 200 in either an active manner or a passive manner (e.g., when the individual 130 is asleep). In one example, the individual 130 may designate a particular device sleep time. Alternatively, the identifier 210 may automatically designate a device sleep time based on usage information from the monitor 220. If the identifier 210 determines that the current time is not the device sleep time then the identifier 210 may wait for an interval (block 420) before control returns to block 410. Otherwise, if the identifier 210 determines that the current time is the device sleep time, the monitor 220 may monitor for a user event such as pressing one or more buttons to initiate an outgoing voice call, an IM session, and/or other device-dependent applications to send a text message, to display text and/or image, to play music and/or video, etc. (block 430). For example, the individual 130 may initiate a user event by performing other functions such as moving a joystick or a lever, touching a touchpad, turning a knob, speaking into a speaker, lifting and/or moving a portion of the wireless electronic device 200, plugging or unplugging the wireless electronic device 200 from a docking station (not shown), etc. If the monitor 220 detects a user event, the identifier 210 may determine whether to adjust the device sleep time based on a manner in which the individual 130 may use the wireless electronic device 200 (block 440). In one particular example, the identifier 210 may determine whether a still-awake counter (SAC) is greater than or equal to a still-awake threshold (SAT). The still-awake counter SAC is configured to keep track of a number of times that a user event has been detected after the device sleep time. The still-awake threshold SAT may be configured to a number of times that the monitor 220 may detect a user event after the device sleep time before the identifier 210 may adjust the device sleep time to correspond with the usage pattern of the individual 130. If the still-awake counter SAC is less than the still-awake threshold SAT (i.e., SAC<SAT), the identifier 210 may increment the still-awake counter SAC by one (block 450) and return to block 410. Otherwise, if the identifier 210 determines that the still-awake counter SAC is greater than or equal to the still-awake threshold SAT (i.e., SAC>=SAT), the identifier 210 may reset the still-awake counter SAC to zero (block 460) and adjust the device sleep time (block 470). For example, the identifier 210 may adjust the device sleep time to a later time (e.g., 30 minutes later) in response detecting a user event after the sleep period.

Referring back to block 430, if the monitor 220 fails to detect a user event, the wireless electronic device 200 may proceed to operate in the sleep mode as described in detail below. Turning to FIG. 5, the sleep mode process 500 begins with the controller 230 calibrating a sleep timer to a sleep threshold (ST) (block 510). The sleep threshold ST may be indicative of a time period that the wireless electronic device 200 may operate in the sleep mode. Accordingly, the wireless electronic device 200 may operate in the sleep mode (block 520). In particular, the controller 230 may disable (i.e., little power) or shut off power to various components during the sleep mode to conserve power. For example, the wireless electronic device 200 may be a cellular telephone with a display screen (not shown) to generate text/images and a receiver (e.g., one shown as 240 in FIG. 2) to receive incoming communication. In the sleep mode, the wireless electronic device 200 may turn off the backlight of the display screen. In another example, the wireless electronic device 200 may turn off the receiver 240. While operating in the sleep mode, the controller 230 may monitor for a user event to terminate the sleep mode (block 530). As noted above, for example, a user event may include one or more activities performed by the individual 130 via the wireless electronic device 200 to retrieve e-mail or voice messages, initiate voice calls or IM sessions, browse the Internet, etc. If the controller 230 fails to detect a user event, the controller 230 may determine if the sleep period (SP) is greater than or equal to the sleep threshold ST (block 540). If the sleep period SP is less than the sleep threshold ST (i.e., SP<ST), control returns to block 520 so that the wireless electronic device 200 may continue to operate in the sleep mode. Otherwise, if the sleep period SP is greater than or equal to the sleep threshold ST (i.e., SP>=ST), the wireless electronic device 200 may wake up and end the sleep mode (block 550). Accordingly, the controller 230 may terminate the sleep mode and operate based on the usage pattern (e.g., operate in the active mode and/or the idle mode).

Referring back to block 530, if the controller 230 detects a user event, the controller 230 may determine whether the user event interrupted the sleep period SP. In particular, the controller 230 may determine whether the sleep period SP is greater than or equal to the sleep threshold ST (block 560). If the sleep period SP is less than the sleep threshold ST (e.g., the user event has interrupted the sleep period SP), the controller 230 may determine whether the interrupt counter (IC) is greater than or equal to the interrupt threshold (IT) (block 570). The interrupt counter IC is configured to keep track of a number of cycles that the sleep period SP has been interrupted by a user event. If interrupt counter IC is greater than or equal to the interrupt threshold IT (i.e., IC>=IT), the controller 230 may reset the interrupt counter IC (block 572) and adjust the sleep threshold ST (block 580). In one particular example, the interrupt threshold IT may be predefined as two cycles. If the interrupt counter IC is greater than or equal to the interrupt threshold IT of two cycles, the controller 230 may reset the interrupt counter IC to zero (e.g., IC=0). The controller 230 may also reduce the sleep threshold SP by a time period (e.g., 30 minutes) to compensate for the interruptions by user events and to correspond to the activities of the individual 130. Thus, the wireless electronic device 200 may operate in a manner that reflects the usage pattern of the individual 130 more accurately. The controller 230 may proceed to block 550 to wake up and end the sleep period. Otherwise, if the interrupt counter IC is less than the interrupt threshold IT (i.e., IC<IT) at block 570, the controller 230 may increment the interrupt counter IC (e.g., increment by one cycle) (block 574) and proceed to block 550.

Turning back to block 560, if the sleep period SP is greater than or equal to the sleep threshold ST (i.e., a user event has not interrupted the sleep period SP), the controller 230 may determine whether the non-interrupt counter (NIC) is greater than or equal to the non-interrupt threshold (NIT) (block 590). The non-interrupt counter (NIC) is configured to keep track of a number of that user events did not interrupt the sleep period SP. If the non-interrupt counter NIC is greater than or equal to the non-interrupt threshold NIT (i.e., NIC>=NIT), the controller 230 may reset the non-interrupt counter NIC (block 592) and proceed to block 580 to adjust the sleep threshold ST to compensate for the interruptions and to correspond to the activities of the individual 130. In particular, the controller 230 may reset the non-interrupt counter NIC to zero and extend the sleep threshold ST by a time period (e.g., 30 minutes). Accordingly, the controller 230 may proceed to block 550 to wake up and end the sleep period SP. Otherwise at block 590, if the non-interrupt counter NIC is less than the non-interrupt threshold NIT (i.e., NIC<NIT), the controller 230 may increment the non-interrupt counter NIC (e.g., increment by one cycle) (block 594) and proceed to block 550.

Although the methods and apparatus disclosed herein are described with respect to wireless personal area networks (WPANs), the methods and apparatus disclosed herein may be applied to other suitable types of wireless communication networks. For example, the methods and apparatus disclosed herein may be applied to wireless local area networks (WLANs), wireless metropolitan area networks (WMANs), and/or wireless wide area networks (WWANs). The methods and apparatus described herein are not limited in this regard.

While the methods and apparatus disclosed herein are described with respect to portable wireless electronic devices, the methods and apparatus disclosed herein may be applied to other suitable types of wireless electronic devices. For example, the methods and apparatus disclosed herein may be applied to relatively-stationary wireless electronic devices such as a desktop computer, an external display, an access point device, a mesh point device, a television, a household appliance, etc.

Figure 6:
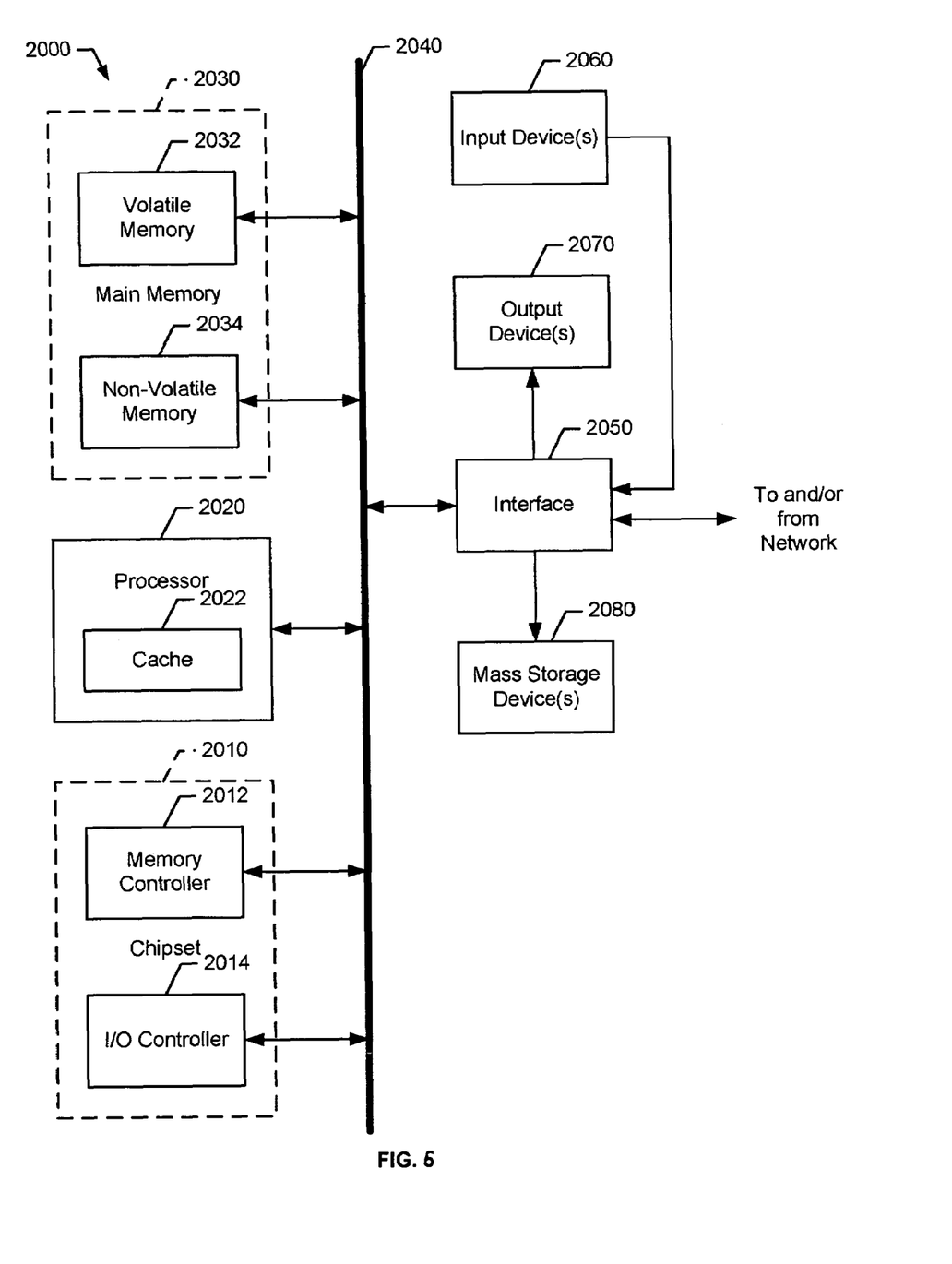
FIG. 6 is a block diagram representation of an example processor system that may be used to implement the example wireless electronic device of FIG. 2.

FIG. 6 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   monitoring, by a wireless electronic device, user input events associated with the wireless electronic device over a period of time;
   identifying, by the wireless electronic device, a usage pattern associated with the wireless electronic device based at least in part on the monitored user input events, the usage pattern indicating varying levels of usage over the period of time; and
   independently controlling, by the wireless electronic device, an operating mode associated with the wireless electronic device over another period of time based on the usage pattern, the another period of time being similar to the period of time in one or more characteristics.

2. A method as defined in claim 1, wherein the monitoring comprises monitoring user input events associated with the wireless electronic device for one or more circadian periods to facilitate generation of a usage pattern corresponding to the one or more circadian periods.

3. A method as defined in claim 1, wherein identifying the usage pattern associated with the wireless electronic device comprises receiving usage information indicative of one or more characteristics associated with another wireless electronic device over the period of time at the wireless electronic device, and wherein the another wireless electronic device and the wireless electronic device are associated with an ensemble of wireless electronic devices, the wireless electronic devices of the ensemble adapted to communicate with each other via short range communication links.

4. A method as defined in claim 1, wherein controlling the operating mode of the wireless electronic device based on the usage pattern comprises initiating a sleep mode associated with the wireless electronic device.

5. A method as defined in claim 1, wherein the identifying comprises dynamically adjusting the usage pattern to operate a sleep mode for a length of time during the period of time.

6. A method as defined in claim 1 further comprising transmitting usage information indicative of the usage pattern over the period of time to one or more wireless electronic devices associated with an ensemble to enable the one or more wireless electronic devices to adapt the usage pattern, the one or more wireless electronic devices of the ensemble adapted to communicate with each other via short range communication links.

7. A method as defined in claim 1, wherein the wireless electronic device comprises one or more of a laptop computer, a handheld computer, a tablet computer, a personal data assistant, a wireless telephone, a pager, an audio/video player, a game device, a digital camera, or a navigation device.

8. An article of manufacture comprising:
   a computer-readable medium; and
   a plurality of programming instructions stored on the computer-readable medium and designed to enable a wireless electronic device to:
   monitor user input events associated with the wireless electronic device over a period of time;
   identify a usage pattern associated with the wireless electronic device based at least in part on the monitored user input events, the usage pattern indicating varying levels of usage over the period of time; and
   independently control an operating mode associated with the wireless electronic device over another period of time based on the usage pattern, the another period of time similar to the period of time in one or more characteristics.

9. An article of manufacture as defined in claim 8, wherein the plurality of programming instructions are designed to enable the wireless electronic device to monitor user input events associated with the wireless electronic device for one or more circadian periods to facilitate generation of a usage pattern corresponding to the one or more circadian periods.

10. An article of manufacture as defined in claim 8, wherein the plurality of programming instructions are designed to enable the wireless electronic device to identify the usage pattern associated with the wireless electronic device by receiving usage information indicative of one or more characteristics associated with another wireless electronic device at the wireless electronic device, and wherein the another wireless device and the wireless electronic device are associated with an ensemble of wireless electronic devices, the ensemble of wireless electronic devices adapted to communicate with each other via short range communication links.

11. An article of manufacture as defined in claim 8, wherein the plurality of programming instructions are designed to enable the wireless electronic device to control the operating mode associated with the wireless electronic device based on the usage pattern by initiating a sleep mode associated with the wireless electronic device.

12. An article of manufacture as defined in claim 8, wherein the plurality of programming instructions are designed to enable the wireless electronic device to dynamically adjust the usage pattern to operate a sleep mode for a length of time during the period of time.

13. An article of manufacture as defined in claim 8, wherein the plurality of programming instructions are designed to enable the wireless electronic device to transmit usage information indicative of the usage pattern over the period of time to one or more wireless electronic devices associated with an ensemble to enable the one or more wireless electronic devices to adapt to the usage pattern, the one or more wireless electronic devices of the ensemble adapted to communicate with each other via short range communication links.

14. An article of manufacture as defined in claim 8, wherein the wireless electronic device comprises one or more of a laptop computer, a handheld computer, a tablet computer, a personal data assistant, a wireless telephone, a pager, an audio/video player, a game device, a digital camera, or a navigation device.

15. A wireless electronic device comprising:
   a monitor adapted to monitor the wireless electronic device for user input events over a period of time;
   an identifier to identify a usage pattern associated with the wireless electronic device based at least in part on the monitored user input events, the usage pattern indicating varying levels of usage over the period of time; and
   a controller to independently control an operating mode associated with the wireless electronic device over another period of time based on the usage pattern, the another period of time similar to the period of time in one or more characteristics.

16. A wireless electronic device as defined in claim 15 wherein the monitor is further adapted to monitor user input events associated with the wireless electronic device for one or more circadian periods to facilitate generation of a usage pattern corresponding to the one or more circadian periods.

17. A wireless electronic device as defined in claim 15 further comprising a receiver to receive usage information indicative of one or more characteristics associated with another wireless electronic device at the wireless electronic device, and wherein the another wireless electronic device and the wireless electronic device are associated with an ensemble of wireless electronic devices, the wireless electronic devices of the ensemble adapted to communicate with each other via short range communication links.

18. A wireless electronic device as defined in claim 15 further comprising a transmitter to transmit usage information indicative of the usage pattern to one or more wireless electronic devices associated with an ensemble via a short range communication link.

19. A wireless electronic device as defined in claim 15, wherein the controller is configured to initiate a sleep mode of the wireless electronic device.

20. A wireless electronic device as defined in claim 15, wherein the identifier is configured to adjust the usage pattern to operate a sleep mode for a length of time during the period of time.

21. A wireless electronic device as defined in claim 15, wherein the ensemble of wireless electronic devices comprises one or more of a laptop computer, a handheld computer, a tablet computer, a personal data assistant, a wireless telephone, a pager, an audio/video player, a game device, or a navigation device.

22. A system comprising:
a flash memory; and
a processor coupled to the flash memory and adapted to:
monitor user input events associated with a wireless electronic device over a period of time;
identify a usage pattern associated with the wireless electronic device based at least in part on the monitored user input events, the usage pattern to indicate varying levels of usage over the period of time; and
control an operating mode associated with the wireless electronic device over another period of time based on the usage pattern, the another period of time similar to the period of time in one or more characteristics.

23. A system as defined in claim 22, wherein the processor is configured to monitor for user input events associated with the wireless electronic device for one or more circadian periods to facilitate generation of a usage pattern corresponding to the one or more circadian periods.

24. A system as defined in claim 22, wherein the processor is configured to receive usage information indicative of one or more characteristics associated with another wireless electronic device at the wireless electronic device, and wherein the another wireless electronic device and the wireless electronic devices are associated with an ensemble of wireless electronic devices, the ensemble of wireless electronic devices adapted to communicate with each other via short range communication links.

25. A system as defined in claim 22, wherein the processor is configured to transmit usage information indicative of the usage pattern to one or more wireless electronic devices associated with an ensemble to enable the one or more wireless electronic device to adapt to the usage pattern, the one or more wireless electronic devices associated with the ensemble adapted to communicate with each other via short range communication links.

26. A system as defined in claim 22, wherein the processor is configured to initiate a sleep mode of the wireless electronic device.

27. A system as defined in claim 22, wherein the processor is configured to dynamically adjust the usage pattern to operate a sleep mode for a length of time during the period of time.

28. A system as defined in claim 22, wherein the wireless electronic device comprises one or more of a laptop computer, a handheld computer, a tablet computer, a personal data assistant, a wireless telephone, a pager, an audio/video player, a game device, or a navigation device.

* * * * *